United States Patent
Bolls et al.

(10) Patent No.: US 9,122,743 B2
(45) Date of Patent: Sep. 1, 2015

(54) ENHANCED SEARCH QUERY MODIFICATION

(75) Inventors: Robert D. Bolls, Mechanicsburg, PA (US); Quyen C. Dao, Dillsburg, PA (US); Michael Dean, Bridgeport, PA (US); Daniel W. Reeves, Mechanicsburg, PA (US); Paul Snyder, Jerseyville, IL (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 12/022,278

(22) Filed: Jan. 30, 2008

(65) Prior Publication Data

US 2009/0192985 A1 Jul. 30, 2009

(51) Int. Cl.
G06F 7/00 (2006.01)
G06F 17/30 (2006.01)

(52) U.S. Cl.
CPC ............... G06F 17/30648 (2013.01)

(58) Field of Classification Search
None
See application file for complete search history.

(56) References Cited

U.S. PATENT DOCUMENTS

| 6,594,670 | B1 | 7/2003 | Genser |
| 7,165,119 | B2 | 1/2007 | Fish |
| 2006/0010126 | A1* | 1/2006 | Anick et al. ............ 707/4 |
| 2006/0122979 | A1 | 6/2006 | Kapur et al. |
| 2006/0206474 | A1 | 9/2006 | Kapur et al. |
| 2006/0224587 | A1 | 10/2006 | Zamir et al. |
| 2007/0250498 | A1* | 10/2007 | Pedersen et al. ........ 707/5 |
| 2008/0140643 | A1* | 6/2008 | Ismalon ................. 707/5 |
| 2009/0119261 | A1* | 5/2009 | Ismalon ................. 707/3 |
| 2009/0144262 | A1* | 6/2009 | White et al. .............. 707/5 |
| 2009/0193352 | A1* | 7/2009 | Bunn ................... 715/780 |

OTHER PUBLICATIONS

Dhyani et al, "A Survey of Web Metrics" (2002).
Kobayashi et al, "Information Retrieval on the Web" (2000).
Henninger, "An Evolutionary Approach to Constructing Effective Software Reuse Repositories", ACM Transactions on Software Engineering and Methodology, 1997.

* cited by examiner

*Primary Examiner* — Kimberly Wilson
(74) *Attorney, Agent, or Firm* — Patrick J. Daugherty; Driggs, Hogg, Daugherty & Del Zoppo Co., LPA

(57) ABSTRACT

Methods, programs products and systems are provided for presenting retrieved search engine results text items to a user on a display device through a graphical user interface configured to associate displayed text items with a search term modification action. Selecting a displayed text item through a graphical user interface component cursor routine automatically instigates modifying of the search term through the associated modification action with the selected text item to generate a modified search term and causes a search engine component to search the modified search term and retrieve new search results similarly presented, enabling additional automatic iterations of search term modifying, searching and result presenting. Modifying a search term may occur automatically or through a selection from a generated list of revising actions, and presenting search results text items may include ordering and presenting a list of result text items relative to an occurrence frequency.

21 Claims, 2 Drawing Sheets

ENHANCED SEARCH QUERY MODIFICATION

FIELD OF THE INVENTION

The present invention generally relates to text-based data searching and, more particularly, to methods, systems, and program products for enhanced searching responsive to selected text result data.

BACKGROUND OF THE INVENTION

Search engines are used in computing applications to find files, documents or internet web pages by using text search terms. A search term may be a single word or term or a phrase or other plurality of words, and search engines use a variety of methodology to find results relevant to the term, including searching file and web page names, text content and other associated text information such as embedded tags. A vast amount of data is generally available for search and retrieval by a search engine, including files and text data residing upon local computers or devices, local area networks (LAN), wide area network (WAN), and internet and intranet networked computer resources and their associated storage devices. Thus, finding data relevant to a search term is generally not a challenge. Problems arise instead in identifying and presenting the most relevant data to a search engine user in an efficient manner.

Although preferred search results for a given search may be defined by a number of limiting parameters, in order to ensure finding preferred results a successful search usually starts with a broad search term. Broad search terms generally return a vast plurality of results of divergent types, quality and relevance to the search target, particularly when the internet is included within the search domain. Thus, initial search engine results must often be refined by revising search terms to include or exclude one or more search words or parameters, with refined search results generated through initiating additional narrowing searches, often through multiple search term entry and search initiation iterations.

Each new search iteration generally requires a user to navigate a device display screen cursor to a search engine dialog box with a mouse or other pointer device, type in new search terms through keystroke methods, and then initiate the new search by some other keyboard or pointer device input, which often requires still further navigation of the screen cursor to another search-initiation icon located at another area of the screen. Such keyboarding and cursor guiding activities may be especially cumbersome, time-consuming and annoying to users, and in particular to users with low keyboarding skills or disabilities that may interfere with or encumber keyboarding tasks.

Some prior art search engines attempt to improve the search experience by improving subsequent searching efficiencies and keyboarding tasks by analyzing search terms and/or search results and providing hyperlinked lists of suggested substitute search terms words, or links to other specialized internet search engines, that appear most relevant through said analysis. Such suggested search modifications or link referrals are intended to enable a user to avoid retyping new search terms, and instead initiate a subsequent search by simply clicking on one of the proffered links. However, the ability to accurately predict a user's preferred search results and thereby generate relevant suggested links or substitute search terms from a simple broad term is limited, particularly in the case of very broad search terms, and often suggested terms and links are unsatisfactorily off-target. And commercial search engines generally bias links and suggested search term toward paid advertisers or other entities that pay the search engine provider for inclusion, at the exclusions of other and perhaps better non-commercial or non-client links and web providers. Thus, it is common for none of the suggested new search terms or proffered web page links provided by the prior art to appear relevant to the user's search objective, who must instead again keyboard in a new search term and start searching again.

Unsatisfactory and cumbersome search engine use experiences may drive a user to try another search engine provider, resulting in a loss of web-based advertising revenue to an abandoned search engine provider.

SUMMARY OF THE INVENTION

Methods, programs products and systems are provided for improved techniques for enabling a search engine user to quickly and effectively review initial search results, identify and select better or more relevant search terms through a review of the search results, and through such selection automatically revise an initial search term accordingly and execute a subsequent search, and further while reducing keyboarding demands on the user. Thus, some methods comprise a programmable device search engine component searching a database for textual information relevant to a search term and retrieving search results text items; presenting retrieved search results text items to a user on a display device through a graphical user interface configured to associate each of the displayed text items with at least one search term modification action instigated by a cursor selection routine; and selecting at least one of the displayed text items through a graphical user interface component cursor routine, the selecting routine automatically instigating: modifying the search term through the associated at least one search term modification action with the selected text item to generate a modified search term; causing the search engine component to search the at least one database for textual information relevant to the modified search term and retrieve search results comprising a plurality of text items; and presenting the modified search term search results to a user on the display device through the graphical user interface configured to associate each of the displayed text items with the at least one search term modification action instigated by the cursor selection routine. And some methods comprise selecting displayed modified search term search results text items through the graphical user interface routine, the selection causing another iteration of search term modifying, search engine component searching and result presenting.

Some methods comprise automatically modifying a search term through an associated search term modification action by automatically deleting the selected text item from the search term if already present within a current search term, or automatically adding the item to the current search term if not already present within the search term. Other methods comprise modifying a search term through an associated search term modification action with a selected text item by generating a list of revising actions; presenting the list through the graphical user interface, each of the revising actions selectable through a cursor selection routine; and a user selecting the associated search term modification action from the list through the cursor routine. In some methods, the revising action list comprises: including the selected item into the search term; deleting the selected item from the search term; and excluding a presenting of any search results that include the selected word.

The selected text item may be a plurality of text words, such as an ordered text phrase, or it may be a subset of discrete text word characters. And some methods comprise presenting retrieved search results by ordering a list of the search results text words with respect to an occurrence frequency of each listed word within the search results, and presenting the ordered list to a user for selection of the selected text item.

In another aspect, methods are provided for producing computer executable program code, storing the produced program code on a computer readable medium, and providing the program code to be deployed to and executed on a computer system thereby providing a computer infrastructure being operable to perform one or more of the method steps described above, for example by a service provider who offers to implement, deploy, and/or perform functions for others. Still further, an article of manufacture comprising a computer usable medium having the computer readable program embodied in said medium may be provided. Such program codes comprise instructions which, when executed on the computer system, cause a computer system to perform one or more of the method steps described above.

Systems, articles and devices configured for search argument modification and initiation of new searching are also provided. Thus, programmable devices are provided comprising a graphical user interface presentment component configured to present search results text items to a user on a display device through a graphical user interface, the search results text items retrieved by a search engine searching at least one database for textual information relevant to a search term, the search results comprising a plurality of text items, and wherein the graphical user interface presentment component is configured to associate each of the displayed text items with at least one search term modification action. A graphical user interface text item selector component is configured to select an item of the displayed text items through a graphical user interface cursor selection routine and automatically instigate the associated at least one search term modification action. And a search term modifier component is configured to modify the search engine search term by the associated at least one search term modification action with the selected text item to generate a modified search term in response to the graphical user interface text item selector component instigation and automatically cause the search engine to search the at least one database for textual information relevant to the modified search term. The graphical user interface presentment component is further configured to display through the graphical user interface a plurality of search results text items retrieved by the search engine through searching the modified search term, the graphical user interface presentment component associating each of the displayed modified search term search results text items with the at least one search term modification action.

Devices are also provided wherein a search term modifier component is configured to automatically modify a search term through an associated search term modification action with a selected text item by deleting the selected text item from the search term if the selected text word is already present within a current search term, or by adding the selected text item to the search term if the selected text word is not already present within the current search term. In some devices, the search term modifier component is configured to modify the search term through the an associated search term modification action with the selected text item by generating a list comprising a plurality of revising actions, presenting the list of revising actions to a user through the graphical user interface, and enabling a user to select the at least one associated search term modification action from the list through a graphical user interface component cursor routine. And in some devices, a search term modifier component is configured to order a list of a plurality of search results text words with respect to an occurrence frequency of each listed word within the retrieved search results, and present the ordered list to a user for selection of the selected text item.

BRIEF DESCRIPTION OF THE DRAWINGS

These and other features of this invention will be more readily understood from the following detailed description of the various aspects of the invention taken in conjunction with the accompanying drawings in which.

Figure 1:
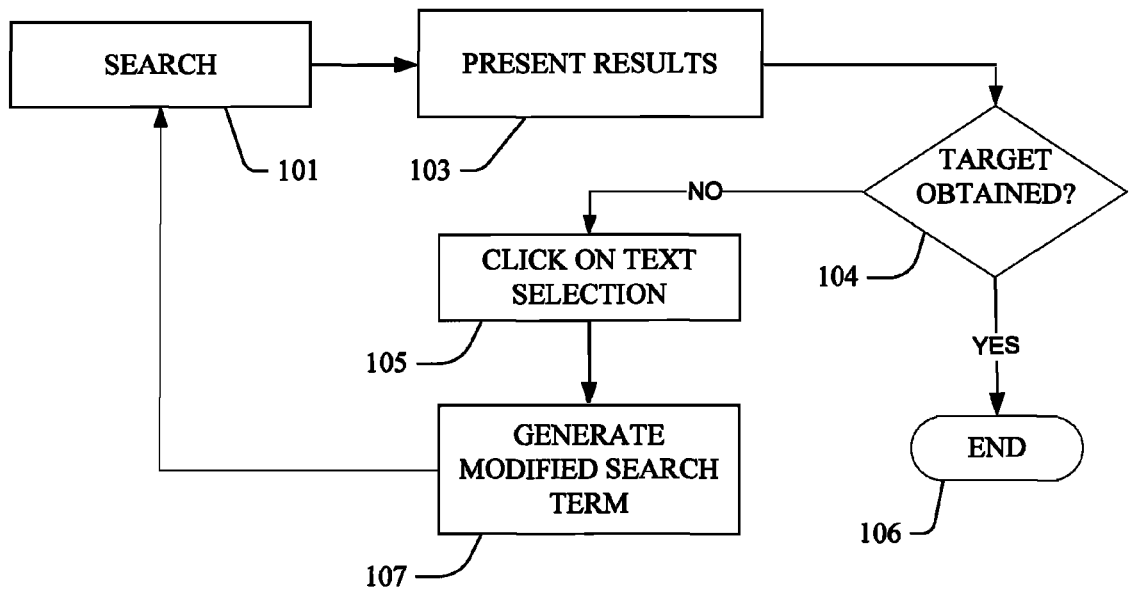
FIG. 1 is a block diagram illustrating a process and system for revising search engine search terms and initiating new searching with the revised terms.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
  I. General Description
  II. Computerized Implementation
I. General Description FIG. 1 illustrates a one-click graphical user interface (GFI) system and process for combining search argument modification and initiation of new searching in one evolution or action. At 101 a search engine searches at least one database (illustratively including local computer device storage media, external storage media accessible through network communications, and the internet) and retrieves a plurality of results from an initial search term entered by a user. The search results are formatted and presented to the user at 103. In one aspect the results may be presented in a conventional browser window format familiar to the user, such as a list of results ranked in order of likely relevance, each list item comprising one or more of a text hyperlink linking to a storage device file location or an internet web page comprising the result item; a text selection from or abstract of the item, providing descriptive information of the item; an item identifier such as an article title or filename with storage device location information; and/or a server or desktop path or internet web address of the item; however, it will be understood that other results presentation formats may also be practiced.

If the search information presented at 103 comprises one or more desired result items as determined by a user at 104, then the search process ends at 106. However, if not then another search engine search iteration may be initiated by the user by searching a revised search term, thus generating new search results for review. More particularly, in reviewing result item text information presented at 103 a user may notice a word or other text item that appears useful to the user, for example in including within or excluding from a subsequent modification of the initial search term. In the prior art result item informational and descriptive content text data, such as text selections and abstract fields, is not hyperlinked or otherwise enabled to initiate a navigation or other action simply by through a mouse click or other graphical user interface (GUI) cursor-initiated routine. And though such a text item may be copied through a GUI cursor selection evolution, using the copied item in a subsequent search still requires cursor navigation to a dialog box, or even another page, and initiation of a subsequent dialog box entry evolution. Requiring a plurality of cursor screen and dialog box data entry or revision steps may be inefficient, cumbersome and annoying to a sophisticated and skilled computer user. And keyboarding, GUI cursor selection and navigation steps, or specific ordered combinations thereof required under the prior art to modify and initiate a subsequent refining search may be prohibitively difficult for some disabled, accessibility-limited or low-skilled users to complete successfully. Thus, prior art search engines may perform unsatisfactorily, inefficiently or even unsuccessfully.

According to the present invention, presenting retrieved search results to a user at 103 also comprises associating search result text items appearing in the presentation with one or more automatic search term modification actions. The associated text items may be characters, character sets and words appearing in informational text data such as document or web page text selections or article abstracts provided with each search result item, though other text items presented may be similarly associated. More particularly, the results presentment at 103 is configured to enable a user through a single mouse-click or other GUI evolution to (1) select a presented result informational text item at 105, (2) the selecting act also modifying the present search term used to generate the results with respect to selected text item at 107, (3) the modifying precipitating a another search engine search of the modified search term at 101, and (4) a presentment of new search results in an automatic screen-refresh presentation at 103, wherein the new search result text items are also associated with at least one search term modification action. And the process may be efficiently repeated as desired by a user, for example at successive iterations until a desired result is obtained at 104 and the process ended at 106.

The text items may be discrete text words appearing on a presented result page. The text items may also be word character subsets selected from a word or a selected plurality of words or characters encompassing more than one discrete word, the selections functioning as the modifying text item at 107. For example, a user may select "support" as a subset of the text word "supportive" appearing on a result page, or a phrase such as "off-road vehicle" appearing in a text selection. Thus, in some embodiments, a text item may be selected by holding down a mouse button while dragging a cursor over the characters defining the desired text item, and then clicking on the highlighted characters.

Associating search term modification actions with the presented text items may be accomplished through hypertext methods and processes, wherein an associated search term modification action is initiated through a hyperlink to an application that performs the modification routine with the associated clicked-item. In other examples, result page text items are enabled for one-click search query term modification functionality through browser-based modifications, such as through provision of a browser plug-in or through an enhancement to the browser itself. Other techniques may be apparent to one skilled in the art for initiating an associated a search term modification action upon graphically selecting a presented text item and the present invention is not limited to the specific embodiments described herein.

Thus, a user may quickly and efficiently revise an initial search term and receive a plurality of new, refined search results, drilling down a search through a corresponding plurality of simple mouse clicks. As will be appreciated, this is a significant improvement in ease of use for a search engine, enabling simple and intuitive search result refinement, and in particular for those with low computer skills or disabilities, or even for those who find using a computing device search engine intimidating or complex. The present invention thus provides query modification ease-of-use compared to prior art techniques, converting much of what is perhaps the most common keystroke activity on the internet, iterative search argument modification, into a series of mouse clicks.

Figure 2:
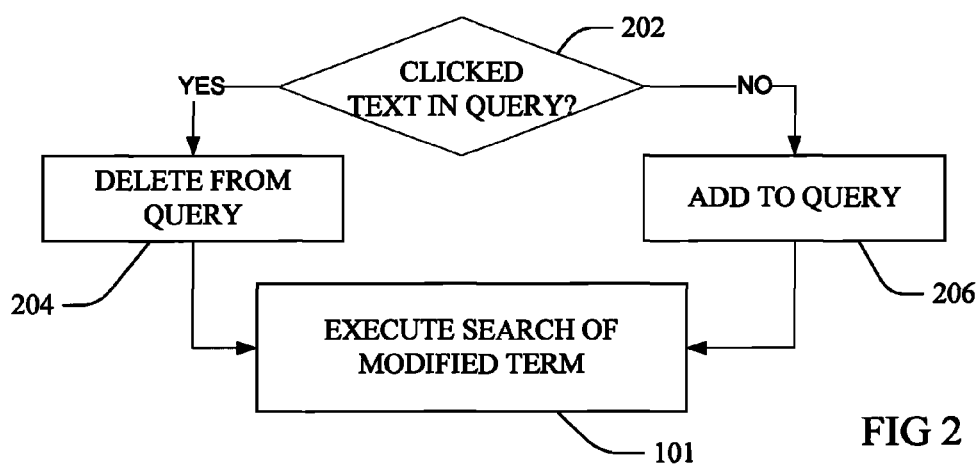
FIG. 2 is block diagram view of components of a process and system for revising search engine search terms and initiating new searching with the revised terms.

FIG. 2 illustrates components of one embodiment of the process illustrated in FIG. 1 and discussed above configured for one-click search term modification and corresponding searching. In one example, a GUI cursor is navigated over an enabled text word presented at 103 (FIG. 1) and a click-text selection input at 105 (FIG. 1) comprises a single input, such as a single left button click in a conventional PC GUI interface or a single click from a single-button mouse or pointer device, the single input causing modification of the search term at 107 comprising initiating a query at 202 to determine whether a clicked text item is already present within the current search term and automatically take an appropriate responsive modifying action: if the item is present, then at 204 the clicked-item is deleted from the search term; but if not, then at 206 the clicked-item is added to the search term. The original search term as modified by 204 or 206 is then searched at 101 of the process of FIG. 1, wherein each of said determining 202, deleting 204 and adding 206 steps may occur in the background, automatically and without knowledge or active engagement of the user.

Figure 3:
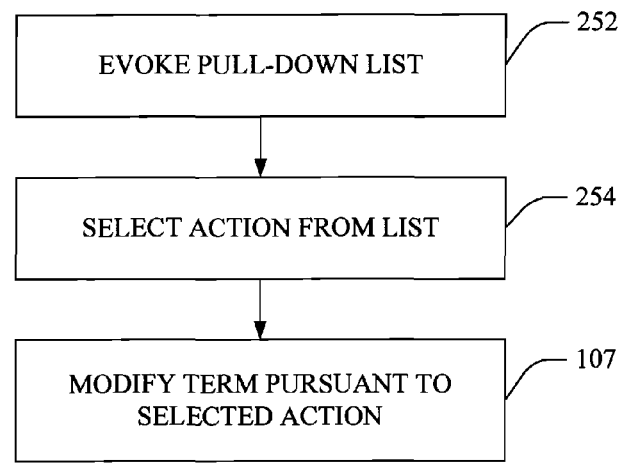
FIG. 3 is block diagram view of components of a process and system for revising search engine search terms and initiating new searching with the revised terms.

In some embodiments of the present invention, a user may be presented with options with regard to a selected text item. Thus, a first click on a presented result text item enables a modification action selection process through at least one second responsive click. Though such embodiments require additional clicking or data inputs from a user, they enable selection from a broader range of possible search term modification actions, and moreover may be combined with one-click or automatic or background processes, such as the process illustrated in FIG. 2. Thus, in one example illustrated in FIG. 3, in response to a user click on a selected text item at 105 (FIG. 1), or to a background determination as to whether a clicked-item is in the present search term at 202 (FIG. 2), a drop-down list is responsively evoked at 252 comprising a plurality of possible revising actions to be effected in association with the clicked-item. Choices in one exemplary drop-down list include (a) including the item into the search term, (b) deleting the item from the search term, or (c) excluding any search results from presentment at 103 that include the clicked-item; however the present example is merely illustrative and not exhaustive, and other possible actions may be provided at 252. The user may then select one of the drop-down list choices by clicking on and thereby selecting one of the listed actions at 254, and the present search term is then accordingly modified at 107 of the process of FIG. 1. Moreover, the drop-down list evoked at 252 may also be compiled responsive to the initiating step: for example, if the list is evoked at 252 in response to a determination at 202 that a selected item is in the present search term, then the evoked list may comprise only choices of (b) deleting the item from the search term or (c) excluding any search results from presentment at 103 that include the clicked-item: there is no need for offering the choice of (a) including the item into the search term.

In some embodiments, result presentment at 103 may further include additional lists or options generated from the result page text items, for example through analysis or processing of the search page results. In one example, an ordered list of words and/or phrases may be included with or associated with a search result page presentation, providing a ranking of words or phrases by frequency of occurrence within the result item. Said ordered list may be accessed via a drop-down list or displayed in a separate page, frame, window or pop-up window. Thus, a user may be readily and quickly informed of those words or phrases occurring with the highest frequency, identifying those items as most likely to be included or excluded in a next search term iteration in order to refine the search. The motivation and mechanism used by the search engine in providing such an ordered list is transparent. If it is based purely upon text item frequency or some other declared parameter, rather than upon an unknown and commercially-influenced search engine algorithm that may be attempting to push a user toward commercially-tied sources, then such a list (or search term modification suggested by such a list) may be perceived as inherently more trustworthy and valuable to a user, thus enhancing the perceived trustworthiness and/or value of the search engine to a user.

The present invention may be configured to enhance the use of conventional browser search engines and related applications, including general internet search engines and browsers such as Google™, MSN Search™, A9™, Yahoo™ or About.com™; site-specific search engines such as those utilized on Amazon.com™ or eBay.com™; or browsers and search engines configured to search specific databases or forums, such as Myspace™ or Flickr™. The present invention thus provides each of use and acceptance by enabling a user to continue to use a familiar and preferred search engine in searching local and internet resources. Other embodiments may be used within other types of search engine applications, as well as within unique and novel search engine provider and interface applications, and thus it will be understood that the present invention is not limited to the specific illustrative examples described herein. Moreover, the present invention provides system, method, and program products enabling improved search engine use by reducing keyboarding demands and quickly and effectively review search results, revise search terms and execute subsequent searches, in one aspect serving as an accessibility feature for those who have difficulty with keyboarding for any site where a list of results is returned in response to a text search-based query.

II. Computerized Implementation

Figure 4:
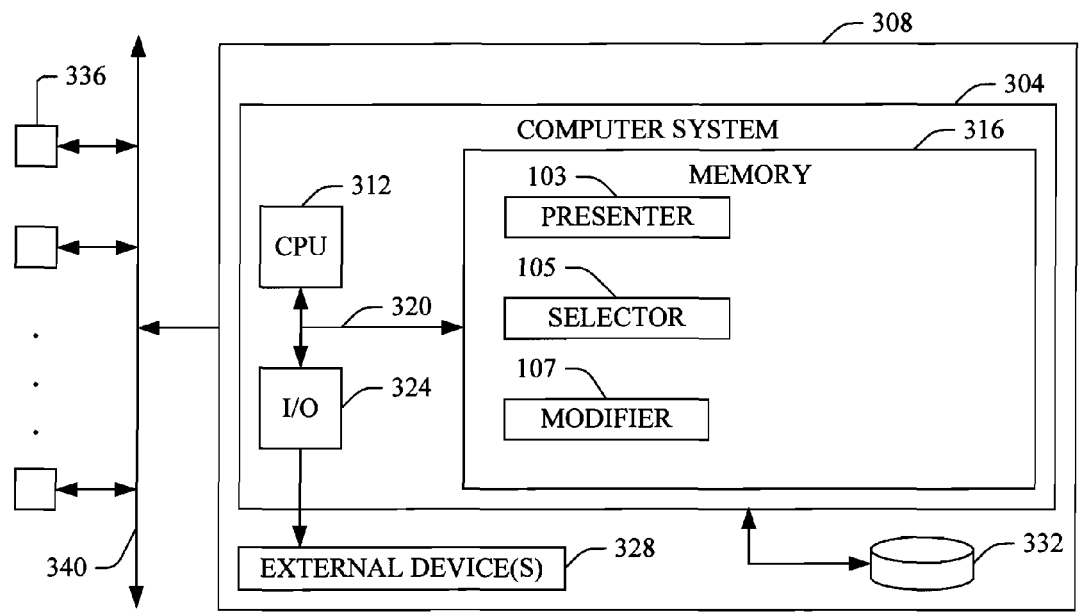
FIG. 4 is a block diagram illustrating an exemplary computerized implementation of a system and method for revising search engine search terms and initiating new searching with the revised terms.

Referring now to FIG. 4, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer system 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for enabling a search engine user to quickly and effectively review and automatically refine initial search results illustrated in FIGS. 1, 2 and 3 and described above, including the presenter 103, the text selector 105 and the search term modifier 107 components discussed above and configured to interface with a search engine provider or component (not shown), which are stored in memory 316 and/or storage system 332. It is to be appreciated that two or more, including all, of these components 103, 105 and 107 may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to modify search arguments and refine searches according to the present invention. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for automatic search argument modification, the method comprising:
  presenting a plurality of discrete search results text words to a user in a graphical user interface display on a display device, wherein the search result text words are retrieved from a search of at least one database as relevant to a current search term that comprises at least one word; and
  in response to the user selecting a text word of the displayed plurality of text words through a graphical user interface device component input, automatically, without requiring any other graphical user interface input action by the user:
    determining whether the selected word is already present within the current search term;
    in response to determining that the selected word is already present within the current search term, modifying the current search term to generate a modified search term by deleting the selected word from the current search term;
    in response to determining that the selected word is not already present within the current search term, modifying the current search term to generate the modified search term by adding the selected word to the current search term;
    searching the at least one database for information relevant to the modified search term and retrieving modified search term results comprising a plurality of modified search term search results text words; and
    presenting the plurality of modified search term search results text words retrieved from the search of the at least one database as relevant to the modified search term to the user in another graphical user interface display on the display device.

2. The method of claim 1, wherein the presenting the plurality of search term search results text words retrieved from the search of the at least one database as relevant to the search term to the user on the display device further comprises associating a hyperlink to a hypertext application with the displayed text words;
  wherein the user selecting the selected text word comprises initiating of the hypertext application by the hyperlink in response to the user selecting the selected word; and
  wherein the automatically determining whether the selected word is already present within the current search term, generating the modified search term by adding or deleting the selected text word, the searching the at least one database for the information relevant to the modified search term, the retrieving the modified search term results comprising the plurality of modified search term search results text words and the presenting the plurality of modified search term search results text words retrieved from the search of the at least one database as relevant to the modified search term to the user in the another graphical user interface display on the display device are accomplished by the hypertext application.

3. The method of claim 1, wherein the presenting the plurality of search term search results text words retrieved from the search of at least one database as relevant to the search term to the user on the display device comprises implementing an enhancement to a browser application to retrieve the presented plurality of search term search results text words and initiating of a process of the implemented browser application enhancement in response to a single click input while a graphical user interface cursor is over the selected word; and wherein the automatically determining whether the selected word is already present within the current search term, the generating the modified search term by adding or deleting the selected text word, the searching the at least one database for the information relevant to the modified search term, the retrieving the modified search term results comprising the plurality of modified search term search results text words and the presenting the plurality of modified search term search results text words retrieved from the search of the at least one database as relevant to the modified search term to the user in the another graphical user interface display on the display device are accomplished by the implemented browser application enhancement process.

4. The method of claim 3, wherein the browser application enhancement is a browser plug-in.

5. The method of claim 1, wherein the presenting the plurality of modified search term search results text words retrieved from the search of the at least one database as relevant to the modified search term to the user on the display device further comprises associating the displayed modified search term search results text words with the search term modification action.

6. The method of claim 1, wherein the selected text word is a selected character subset selected by:
   highlighting the selected character subset by holding down a graphical user interface device button while dragging the cursor over text characters defining the selected character subset; and
   entering a single click input through the graphical user interface device component while the cursor is over the highlighted selected character subset.

7. The method of claim 1, wherein the presenting the plurality of search term search results text words further comprises:
   ordering a list of a plurality of text words of the search term search results with respect to an occurrence frequency of each listed word within the search term search results;
   presenting the ordered list of text words; and
   in response to the user selecting a text word of the presented ordered list of text words, automatically determining whether the selected word of the presented ordered list is already present within the current search term, and generating the modified search term by adding or deleting the selected word of the presented ordered list.

8. A computer system for automatic search argument modification, the computer system comprising:
   a central processing unit;
   computer readable memory in communication with the central processing unit;
   a computer readable storage system in communication with the central processing unit;
   first program instructions to present a plurality of discrete search term search results text words to a user in a graphical user interface display on a display device, wherein the search result text words are retrieved from a search of at least one database as relevant to a search term that comprises at least one word; and
   second program instructions to, in response to the user selecting a text word of the displayed plurality of text words through a graphical user interface device component input automatically, without requiring any other graphical user interface input action by the user:
   determine whether the selected word is already present within the current search term;
   in response to determining that the selected word is already present within the current search term, modify the current search term to generate a modified search term by deleting the selected word from the current search term;
   in response to determining that the selected word is not already present within the current search term, modify the current search term to generate the modified search term by adding the selected word to the current search term;
   search the at least one database for information relevant to the modified search term and retrieves modified search term results comprising a plurality of modified search term search results text words; and
   present the plurality of modified search term search results text words retrieved from the search of the at least one database as relevant to the modified search term to the user on the display device;
   wherein the first and second program instructions are stored on the computer readable storage system for execution by the central processing unit via the computer readable memory.

9. The computer system of claim 8, wherein the first program instructions are to present the plurality of search term search results text words retrieved from the search of at least one database as relevant to the search term to the user on the display device by an association of a hyperlink to a hypertext application with the displayed text words, wherein the user selecting the selected text word initiates the hypertext application; and
   wherein the second program instructions are to automatically determine whether the selected word is already present within the current search term, generate the modified search term by adding or deleting the selected text word, search the at least one database for the information relevant to the modified search term, retrieve the modified search term results comprising the plurality of modified search term search results text words and present the plurality of modified search term search results text words retrieved from the search of the at least one database as relevant to the modified search term to the user on the display device by the hypertext application.

10. The computer system of claim 8, wherein the first program instructions are to present the plurality of search term search results text words retrieved from the search of at least one database as relevant to the search term to the user on the display device by an implementation of an enhancement to a browser application to retrieve the presented plurality of search term search results text words that is initiated in response to a single click input while a graphical user interface cursor is over the selected text word; and
   wherein the second program instructions are to automatically determine whether the selected word is already present within the current search term, generate the modified search term by adding or deleting the selected text word, search the at least one database for the information relevant to the modified search term, retrieve the modified search term results comprising the plurality of modified search term search results text words and present the plurality of modified search term search results text words retrieved from the search of the at least one database as relevant to the modified search term to the user on the display device by the implemented browser application enhancement process.

11. The computer system of claim 10, wherein the browser application enhancement is a browser plug-in.

12. The computer system of claim 8, wherein the second program instructions are further to:
   select the selected text word as a selected character subset by highlighting the selected character subset in response to the cursor being dragged over text characters while a graphical user interface device button is held down; and
   initiate the associated search term modification action in response to the single click input through the graphical user interface device component while the cursor is over the highlighted selected character subset.

13. A computer program product for automatic search argument modification and initiation of revised searching, the computer program product comprising:
   a computer readable hardware storage device;
   first program instructions to present a plurality of discrete search term search results text words to a user in a graphical user interface display on a display device, wherein the search result text words are retrieved from a search of at least one database as relevant to a search term that comprises at least one word; and
   second program instructions to, in response to the user selecting a text word of the displayed plurality of text words through a graphical user interface device component input automatically, without requiring any other graphical user interface input action by the user;
   determine whether the selected word is already present within the current search term;
   in response to determining that the selected word is already present within the current search term, modify the search term with the selected text word to generate a modified search term by deleting the selected word from the current search term;
   in response to determining that the selected word is not already present within the current search term, modify the current search term to generate the modified search term by adding the selected word to the current search term;
   search the at least one database for information relevant to the modified search term and retrieves modified search term results comprising a plurality of modified search term search results text words; and
   present the plurality of modified search term search results text words retrieved from the search of the at least one database as relevant to the modified search term to the user on the display device;
   wherein the first and second program instructions are stored on the computer readable hardware storage device.

14. The computer program product of claim 13, wherein the first program instructions are to present the plurality of search term search results text words retrieved from the search of at least one database as relevant to the search term to the user on the display device by association of a hyperlink to a hypertext application with the displayed text words;
   wherein the user selecting the selected text word initiates the hypertext application by the hyperlink in response to the user selecting the selected text word; and
   wherein the second program instructions are to automatically determine whether the selected word is already present within the current search term, generate the modified search term by adding or deleting the selected text word, search of the at least one database for the information relevant to the modified search term, retrieve the modified search term results comprising the plurality of modified search term search results text words and present the plurality of modified search term search results text words retrieved from the search of the at least one database as relevant to the modified search term to the user on the display device by the hypertext application.

15. The computer program product of claim 13, wherein the first program instructions are to present the plurality of search term search results text words retrieved from the search of at least one database as relevant to the search term to the user on the display device by an implementation of an enhancement to a browser application to retrieve the presented plurality of search term search results text words that is initiated in response to a single click input while a graphical user interface cursor is over the selected text word; and
   wherein the second program instructions are to automatically determine whether the selected word is already present within the current search term, generate the modified search term by adding or deleting the selected text word, search of the at least one database for the information relevant to the modified search term, retrieve the modified search term results comprising the plurality of modified search term search results text words and present the plurality of modified search term search results text words retrieved from the search of the at least one database as relevant to the modified search term to the user on the display device by the implemented browser application enhancement process.

16. The computer program product of claim 15, wherein the browser application enhancement is a browser plug-in.

17. A method for providing a service for automatic search argument modification, the method comprising:
   integrating computer-readable program code into a computer system comprising a central processing unit, a computer readable memory in circuit communication with the central processing unit, and a computer readable hardware storage device in circuit communication with the central processing unit; and
   wherein the central processing unit executes program code instructions stored on the computer-readable storage medium via the computer readable memory and thereby:
   presents a plurality of discrete search term search results text words to a user in a graphical user interface display on a display device, wherein the search result text words are retrieved from a search of at least one database as relevant to a current search term that comprises at least one word; and
   in response to the user selecting a text word of the displayed plurality of text words through a graphical user interface device component input automatically, without requiring any other graphical user interface input action by the user:
   determines whether the selected word is already present within the current search term;
   in response to determining that the selected word is already present within the current search term, modifies the current search term to generate a modified search term by deleting the selected word from the current search term;
   in response to determining that the selected word is not already present within the current search term, modifies the current search term to generate the modified search term by adding the selected word to the current search term;
   searches the at least one database for information relevant to the modified search term and retrieves modified search term results comprising a plurality of modified search term search results text words; and presents the plurality of modified search term search results text words retrieved from the search of the at least one database as relevant to the modified search term to the user on the display device.

18. The method of claim 17, wherein the central processing unit executes program code instructions stored on the computer-readable hardware storage device via the computer readable memory and thereby:

presents the plurality of search term search results text words retrieved from the search of at least one database as relevant to the search term to the user on the display device by an association of a hyperlink to a hypertext application with the displayed text words, wherein the user selecting the selected text word initiates the hypertext application by the hyperlink; and automatically determines whether the selected word is already present within the current search term, generates the modified search term by adding or deleting the selected text word, searches the at least one database for the information relevant to the modified search term, retrieves the modified search term results comprising the plurality of modified search term search results text words and presents the plurality of modified search term search results text words retrieved from the search of the at least one database as relevant to the modified search term to the user on the display device by the hypertext application.

19. The method of claim 17, wherein the central processing unit executes program code instructions stored on the computer-readable hardware storage device via the computer readable memory and thereby:

presents the plurality of search term search results text words retrieved from the search of at least one database as relevant to the search term to the user on the display device by an implementation of an enhancement to a browser application to retrieve the presented plurality of search term search results text words that is initiated in response to a single click input while a graphical user interface cursor is over the selected text word; and automatically determines whether the selected word is already present within the current search term, generates the modified search term by adding or deleting the selected text word, searches the at least one database for the information relevant to the modified search term, retrieves the modified search term results comprising the plurality of modified search term search results text words and presents the plurality of modified search term search results text words retrieved from the search of the at least one database as relevant to the modified search term to the user on the display device by the implemented browser application enhancement process.

20. The method of claim 19, wherein the browser application enhancement is a browser plug-in.

21. The method of claim 17, wherein the computer central processing unit executes program code instructions stored on the computer-readable hardware storage device via the computer readable memory and thereby presents the plurality of search term search results text words by:

ordering a list of a plurality of text words of the search term search results with respect to an occurrence frequency of each listed word within the search term search results; and presenting the ordered list of text words; and in response to the user selecting a text word of the presented ordered list of text words, automatically determining whether the selected word of the presented ordered list is already present within the current search term, and generates the modified search term by adding or deleting the selected word of the presented ordered list.

\* \* \* \* \*